(12) United States Patent
Arduini

(10) Patent No.: US 10,473,141 B2
(45) Date of Patent: Nov. 12, 2019

(54) SELF-FASTENING THREADED INSERT AND PROCESS FOR ASSEMBLING SUCH THREADED INSERT

(71) Applicant: Specialinsert s.r.l., Turin (IT)

(72) Inventor: Piero Arduini, Turin (IT)

(73) Assignee: Specialinsert s.r.l., Turin (IT)

( * ) Notice: Subject to any disclaimer, the term of this patent is extended or adjusted under 35 U.S.C. 154(b) by 109 days.

(21) Appl. No.: 15/564,579

(22) PCT Filed: Apr. 7, 2015

(86) PCT No.: PCT/IT2015/000098
§ 371 (c)(1),
(2) Date: Oct. 5, 2017

(87) PCT Pub. No.: WO2016/162889
PCT Pub. Date: Oct. 13, 2016

(65) Prior Publication Data
US 2018/0080493 A1    Mar. 22, 2018

(51) Int. Cl.
*F16B 37/04*    (2006.01)
*F16B 37/12*    (2006.01)
*F16B 13/08*    (2006.01)

(52) U.S. Cl.
CPC ........ *F16B 37/122* (2013.01); *F16B 13/0866* (2013.01)

(58) Field of Classification Search
USPC ................. 411/108, 111, 112, 176, 182, 510
See application file for complete search history.

(56) References Cited

U.S. PATENT DOCUMENTS

| | | | |
|---|---|---|---|
| 1,373,645 A * | 4/1921 | Bandoly | F16B 13/0866 411/182 |
| 4,140,040 A | 2/1979 | Modrey | |
| 4,810,144 A * | 3/1989 | Martelli | F16B 9/026 411/182 |
| 4,840,144 A | 3/1989 | Martelli | |
| 5,071,299 A * | 12/1991 | Sekine | F16B 37/065 29/444 |
| 5,104,272 A * | 4/1992 | Dupont | F16B 21/06 24/297 |
| 5,180,264 A * | 1/1993 | Farwell | F16B 13/06 411/32 |
| 5,308,205 A * | 5/1994 | Lautenschlager | F16B 13/02 411/182 |

(Continued)

FOREIGN PATENT DOCUMENTS

EP    1277973 B1    11/2005

*Primary Examiner* — Gary W Estremsky
(74) *Attorney, Agent, or Firm* — Kelly & Kelley, LLP

(57) ABSTRACT

A self-fastening threaded insert is described, with respect to a slab of building material, comprising a bearing element with respect to the slab, a deformation element adapted to interact with the slab, and a supporting element cooperating with the bearing element. The deformation element is deformed due to the effect of an external load transmitted by the supporting element, and is adapted to transmit to the slab forces which are perpendicular to an application force of the external load to be able to fasten the threaded insert to the slab. A process for assembling such threaded insert is also described.

8 Claims, 3 Drawing Sheets

(56) References Cited

U.S. PATENT DOCUMENTS

| | | | | |
|---|---|---|---|---|
| 5,310,298 A * | 5/1994 | Hwang | ............... | F16B 7/18 |
| | | | | 411/182 |
| 5,503,492 A * | 4/1996 | Stevens | ............... | F16B 7/0413 |
| | | | | 16/42 T |
| 5,544,922 A * | 8/1996 | Shumard | ............... | F16L 23/024 |
| | | | | 285/23 |
| 7,114,298 B2 * | 10/2006 | Kotler | ............... | E01C 5/20 |
| | | | | 52/177 |
| 9,101,069 B2 * | 8/2015 | Tsai | ............... | H05K 7/142 |
| 2007/0009341 A1 * | 1/2007 | Nagayama | ............... | B21K 1/56 |
| | | | | 411/432 |
| 2008/0031702 A1 * | 2/2008 | Chen | ............... | F16B 37/122 |
| | | | | 411/182 |
| 2008/0170928 A1 * | 7/2008 | Stadler | ............... | F16B 13/02 |
| | | | | 411/392 |
| 2012/0151733 A1 | 6/2012 | Fabre et al. | | |
| 2016/0040707 A1 * | 2/2016 | Droste | ............... | F16B 37/122 |
| | | | | 411/321 |

\* cited by examiner

SELF-FASTENING THREADED INSERT AND PROCESS FOR ASSEMBLING SUCH THREADED INSERT

The present invention refers to a self-fastening threaded insert and to a process for assembling a threaded insert. In particular, the present invention refers to a self-fastening threaded insert with respect to a slab of building material.

Generally, a self-fastening threaded insert allows arranging a threaded seat on a slab of building material, such as marble, granite or other stone material, wood, glass and composite material, such as carbon and further new-generation elements of a compact nature known as "solid surfaces".

Such threaded seat allows fastening the slab to a structure or frame to make vented facades, building coatings, building environments, furniture, sanitary elements, kitchens, funeral works of art, etc.

The prior art, represented for example, by EP1277973 B1, refers to a small fastening block comprising a cylindrical separating body with an internal drilling. The body is axially divided into two segments, mutually connected by snap-type closures. A separating device is housed in a body recess. However, in order to fasten the small block to the slab, it is necessary to rotate the body with a tool, creating an insertion effect in the slab hole.

Object of the present invention is providing a self-fastening threaded insert which allows avoiding to have to recur to external means for assembling, once having obtained a hole when working with the use of standard means.

A further object is providing a self-fastening threaded insert which allows a completely disappearing assembling, without external encumbrances, to facilitate handling and storing the slabs.

The above and other objects and advantages of the invention, which will result from the following description, are obtained with a self-fastening threaded insert as claimed in claim 1.

Moreover, the above and other objects and advantages of the invention, which will result from the following description, are obtained with a process for assembling a self-fastening threaded insert as claimed in claim 10.

Preferred embodiments and non trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described, without departing from the scope of the invention as appears from the enclosed claims.

The present invention will be better described by some preferred embodiments thereof, provided as a non-limiting example, with reference to the enclosed drawings, in which.

Figure 1:
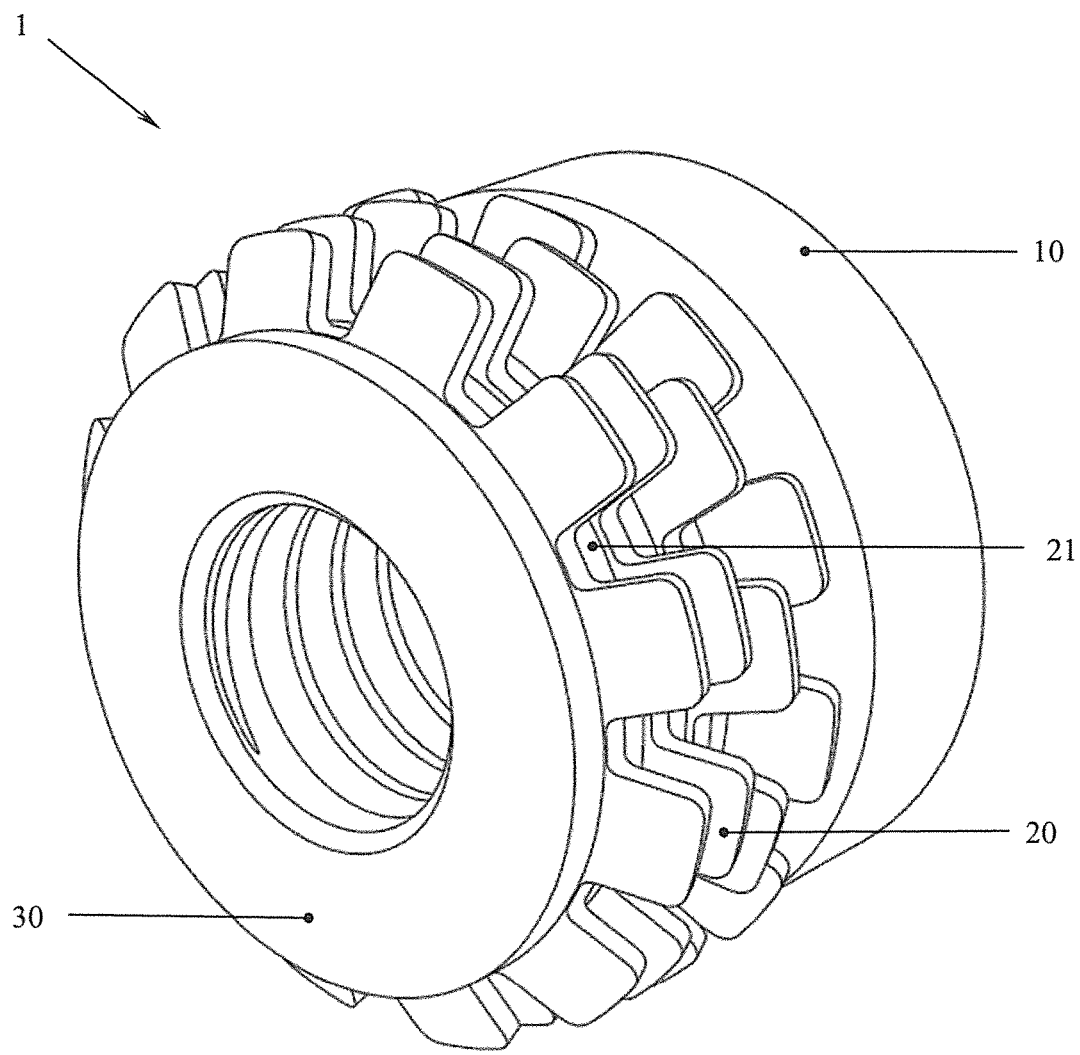
FIG. 1 shows a perspective View of an embodiment of the self-fastening threaded insert according to the present invention.
Figure 2:
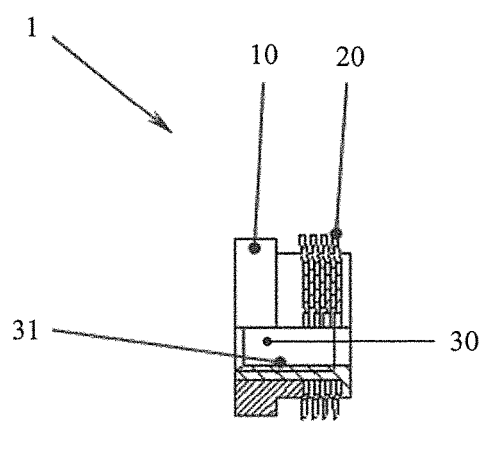
FIGS. 2 to 5 show partially sectioned side views along the axis of symmetry respectively of various embodiments of the self-fastening threaded insert according to the present invention.
Figure 3:
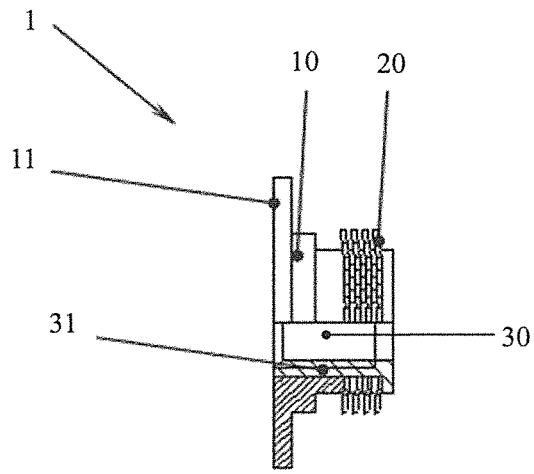
Figure 4:
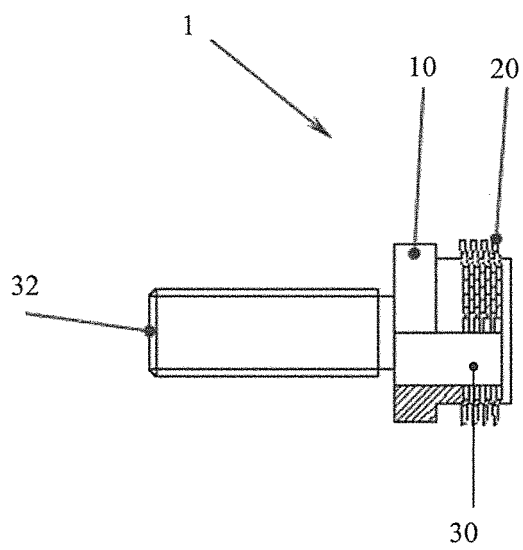

With reference to FIGS. 1, 2 and 3, it is possible to note that a threaded insert 1 with automatic fastening with respect to a slab of building material comprises a bearing element 10 with respect to the slab, at least one deformation element 20 adapted to interact with the slab, and a supporting element 30 cooperating with the bearing element 10.

Advantageously, such at least one deformation element 20 is deformed due to the effect of an external load transmitted by the supporting element 30. In this way, such at least one deformation element 20 can transmit to the slab forces which are perpendicular to an application force of the external load, to allow the threaded insert 1 to get fastened to the slab.

Advantageously, the supporting element 30 can support a battery of deformation elements 20, preferably in a number ranging at least three elements connected. in series or more, depending on applications.

With reference to FIGS. 2, 4, 6 and 7, it is possible to note that the bearing element 10 adapted to contain the supporting element 30 is housed in a recess of the slab to allow the threaded insert 1 to abut against an internal surface RF of the recess without projecting from an external face SF of the slab.

Figure 5:
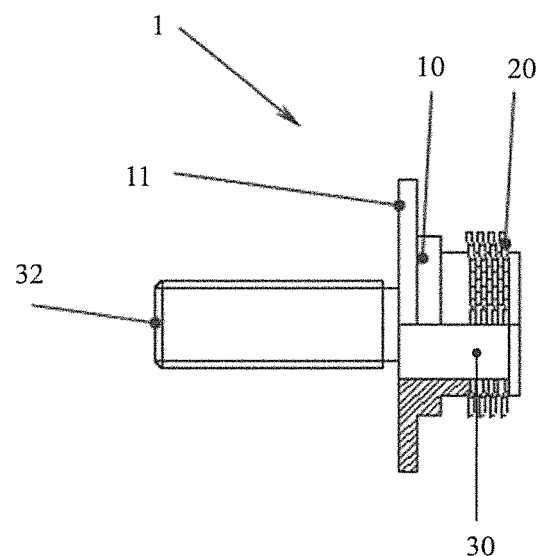
Figure 6:
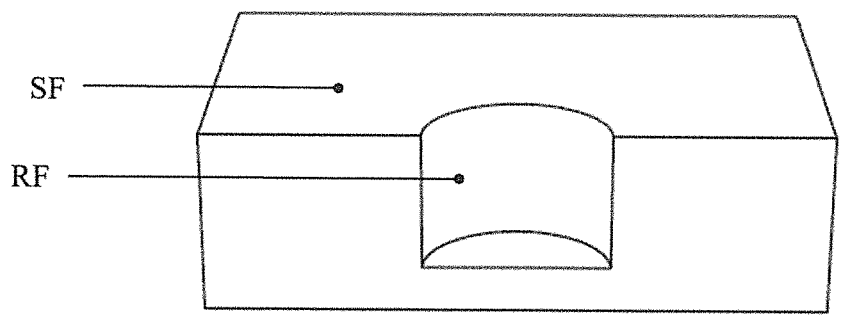
FIG. 6 shows a perspective view of a sectioned portion of a slab adapted to house the self-fastening threaded insert, according to the present invention.
Figure 7:
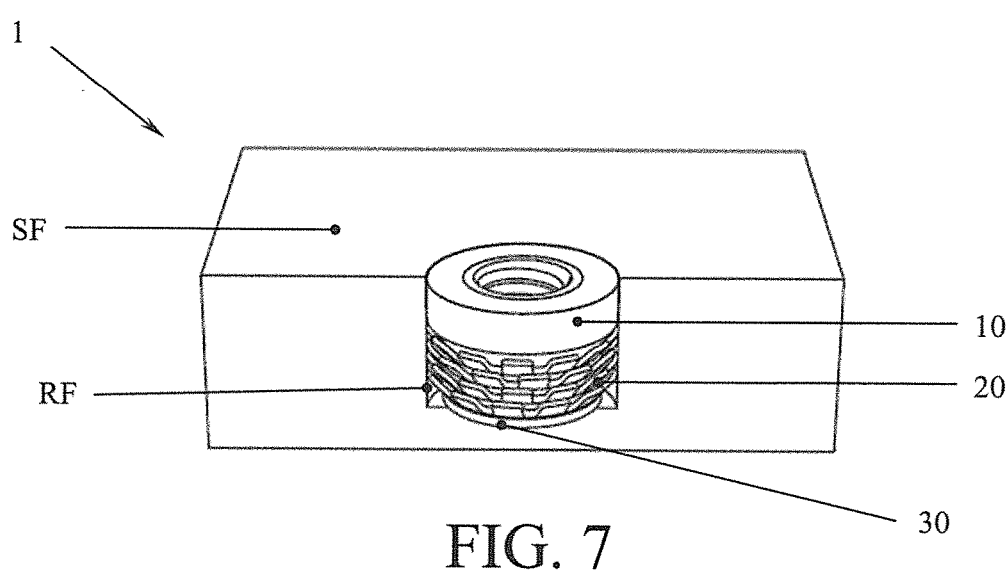
FIG. 7 shows a perspective view of the slab of FIG. 6 coupled with an embodiment of the self-fastening threaded insert according to the present invention.

With reference to FIGS. 3, 5 and 6, it is possible to note that the bearing element 10 adapted to contain the supporting element 30 comprises an abutment flange 11 with respect to an external face SF of the slab to allow the threaded insert 1 to abut at least against the external face SE of the slab.

At least one of such deformation elements 20 can comprise an elastic toothed crown, adapted to be housed with interference in a cylindrical recess of the slab. As shown in FIG. 1, the teeth extending from the elastic tooth crowns of the spaced apart deformation elements 20 are offset with respect to teeth of the adjacent crown.

Alternatively, each deformation element 20 can comprise a smooth or toothed cup spring, adapted to be housed with interference in a cylindrical recess of the slab (not shown).

According to a preferred configuration, each deformation element 20 can be connected to at least one spacer ring 21, as shown in FIG. 1.

Figure 8:
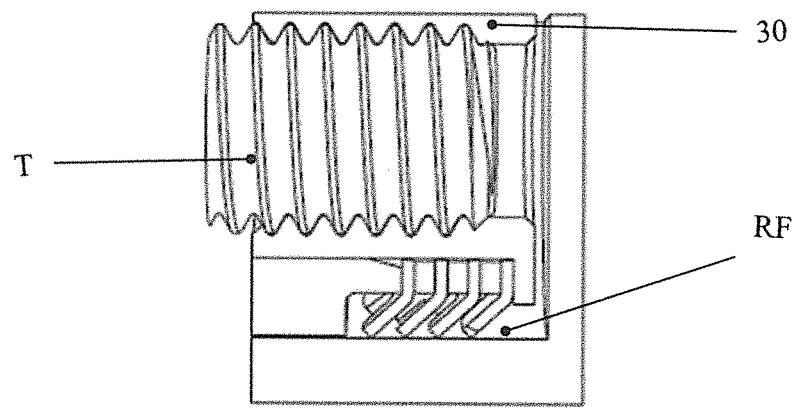
FIG. 8 shows a partial and enlarged side sectional view of an embodiment of the self-fastening threaded insert equipped with an external connection element screwed according to the present invention.

With reference to FIG. 8, it is possible to note that the supporting element 30 comprises abutting means adapted to block a connection element T screwed to the threaded insert 1 to prevent the threaded insert 1 from going out of the recess of the slab.

Preferably, the abutting means can comprise a blind threaded hole or a partially threaded through-hole or prevent a screw T from pressing onto the bottom of the recess of the slab.

With reference to FIGS. 2 to 5, the threaded insert 1 can alternatively operate as connection element through an internal threading 31 and an external threading 32.

The bearing element 10 made of plastic or metallic material, depending on the application, and the supporting element 30 made of metal allow supporting loads with a high force.

A process for assembling a self-fastening threaded insert 1 with respect to a slab of building material comprises the steps of:

performing an excavation of the slab to obtain a receiving recess;

applying the threaded insert 1 into the receiving recess to allow fastening the bearing element 10 to the slab and housing with interference, with respect to an internal wall RF of the recess of the slab, each deformation element 20 belonging to the threaded insert 1;

connecting an external element through a connection element T screwed onto the threaded insert 1.

The threaded insert 1 allows obtaining the objects of the invention, with the advantages of allowing an assembling after having performed a simple hole on the slab, even when working, with the use of standard tools, being able to quickly insert the threaded insert into such hole through a simple pressure, without having to add adhesives and gluing agents.

Moreover, the threaded insert of the invention allows performing an assembling of the threaded insert with disappearing, without external encumbrances, facilitating handling and storage of the slabs.

A further advantage is given by the absence of stresses on the receiving material when the threaded insert is not stressed, while during its use the elastic washers are stressed by an axial traction force, radially acting against the walls due to flexure and pressure, preventing the insert from going out of the slab.

The threading of the supporting element made as non-through ensures the fastening of the threaded insert onto the slab, avoiding the extraction effect generated by the possible inappropriate length of the screw.

The invention claimed is:

1. A self-fastening threaded insert adapted to be mounted with respect to a slab of building material, the threaded insert comprising:

a bearing element;

at least three spaced apart deformation elements adapted to interact with said slab, wherein each deformation element comprises an elastic toothed crown having teeth over the entire circumference of the crown, and is adapted to be housed with interference in a cylindrical recess of said slab, wherein teeth of adjacent crowns are offset from one another;

a spacer ring connected to a respective deformation element; and a supporting element cooperating with said bearing element, wherein said at least one deformation element is deformed due to the effect of an external load transmitted by said supporting element, said at least one deformation element being adapted to transmit to said slab forces which are perpendicular to an application force of said external load to be able to fasten said threaded insert to said slab.

2. The threaded insert of claim 1, wherein said bearing element is adapted to contain said supporting element and is adapted to be housed in a recess of said slab to allow said threaded insert to abut onto an internal surface of said recess without projecting from an external face of said slab.

3. The threaded insert of claim 1, wherein said bearing element is adapted to contain said supporting element and comprises an abutment flange to allow said threaded insert to abut against at least an external face of said slab.

4. The threaded insert according to claim 1, wherein each of said deformation elements is connected to a respective spacer ring.

5. The threaded insert according to any one of claim 1 to 3 or 4, wherein said at least one deformation element comprises a cup spring adapted to be housed with interference in a cylindrical recess of said slab.

6. The threaded insert according to claim 1, wherein said supporting element comprises an abutment adapted to block a connection element screwed onto said threaded insert to prevent said threaded insert from being extracted from the recess of said slab.

7. The threaded insert according to claim 1, including a connection element comprising an internal threading or an external threading.

8. The threaded insert according to claim 1, wherein said bearing element is made of plastic or metallic material and said supporting element is made of metal to allow supporting loads with a high force.

* * * * *